United States Patent
Chiang et al.

(10) Patent No.: US 7,352,622 B2
(45) Date of Patent: Apr. 1, 2008

(54) DATA ARRANGEMENT AND DATA ARRANGING METHOD IN STORAGE DEVICE

(75) Inventors: Chin-Yi Chiang, Taipei (TW); Tung-Chih Kuo, Taipei (TW); Chun-Hua Tseng, Taipei (TW); Yu-Wei Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/461,256

(22) Filed: Jul. 31, 2006

(65) Prior Publication Data

US 2007/0061503 A1 Mar. 15, 2007

(30) Foreign Application Priority Data

Aug. 23, 2005 (TW) .............................. 94128817 A

(51) Int. Cl.
*G11C 16/00* (2006.01)

(52) U.S. Cl. .............................. 365/185.11; 365/185.09; 365/200

(58) Field of Classification Search .......... 365/185.02, 365/185.09
See application file for complete search history.

(56) References Cited

U.S. PATENT DOCUMENTS

| | | | | |
|---|---|---|---|---|
| 5,077,720 A | * | 12/1991 | Takagi et al. ............. | 369/59.25 |
| 5,629,948 A | * | 5/1997 | Hagiwara et al. ........... | 714/748 |
| 5,742,582 A | * | 4/1998 | Suzuki ..................... | 369/275.1 |
| 6,906,961 B2 | * | 6/2005 | Eggleston et al. ...... | 365/185.29 |

* cited by examiner

*Primary Examiner*—Tan T. Nguyen
(74) *Attorney, Agent, or Firm*—Kirton & McConkie; Evan R. Witt

(57) ABSTRACT

The disclosure relates to a data arranging method of a flash memory for improving access performance. The method includes steps of storing a first data sector to a page of the flash memory; storing a first data correction set corresponding to the first data sector in the page of the flash memory, wherein the first data correction set is next and contiguous to the first data sector; and repeating the two storing steps for storing a plurality of data sectors and a plurality of corresponding data correction sets until the page is formed.

20 Claims, 2 Drawing Sheets

DATA ARRANGEMENT AND DATA ARRANGING METHOD IN STORAGE DEVICE

FIELD OF THE INVENTION

The present invention relates to a data arrangement and data arranging method in a storage device, and more particularly applied to a data arrangement and data arranging method in a flash memory for improving access performance and increasing error coverage rate.

BACKGROUND OF THE INVENTION

Flash memory has been widely used in electronic products. However, limit by the data arrangement and the sequentially accessing feature of the flash memory in prior art, flash memory access performance cannot increased obviously without functions of partial read and partial write provided by flash memory itself. It is a big issue for a high-speed data access requirement.

As known in the art, a page is defined as a basic data access unit of a flash memory and each page is formed by a plurality of data sectors and a plurality of data correction sets. Also, the data sectors and the data correction sets have relation of the one to one correspondence. Size of a page varies with the capacity of the flash memory. For example, size of a 512-page, a low-capacity flash memory, is (512 bytes+16 bytes); wherein 512 bytes indicate the total bytes of all data sectors in one page and 16 bytes indicate the total bytes of all data correction sets in one page. Another example, size of 2K-page, a high-capacity flash memory, is (2K bytes+64 bytes); wherein 2K bytes indicate the total bytes of all data sectors in one page and 64 bytes indicate the total bytes of all data correction sets in one page. A data correction set comprises at least one set of error correction code, e.g. ECC, which is generated in response to a data sector via a well-known data correction algorithm.

FIG. 1 depicts a data arrangement of a flash memory in prior art. Page P1 comprises four data sectors S11~S14, and four data correction sets E11~E14 corresponding to the four data sectors S11~S14, and each data correction set includes one set of error correction code. These four data sectors S11~S14 and four data correction sets E11~E14 together form a Page P1. By using 2K-Page as an example, the size of each data sector S11~S14 is 512 bytes, and the size of each data correction set is 16 bytes. In addition, for increasing the accessing speed of the flash memory, there is usually a data access buffer (not shown in FIG. 1) for storing data temporarily and transferring data rapidly. Detail description of the data access buffer will be omitted, because the data access buffer can be implemented by conventional registers.

Conventionally, as depicted in FIG. 1, the four data sectors S11~S14 are arranged opposite the four data correction sets E11~E14, respectively. According to the arrangement of the flash memory in prior art, if a data sector within Page P1 needs to be accessed, a plurality of unnecessary data sectors or data correction sets will be accessed to the data access buffer if the flash memory does not have functions of partial read and partial write. As FIG. 1 depicting, if a microprocessor needs to access data in the data sector S12 in an event, data correction set E12 will be also accessed for detecting errors in the data sector S12. However, for accessing data correction set E12, two data sectors S13, S14, and one data correction set E11 will be also accessed to the data access buffer cause of the conventional data arrangement and sequentially accessing feature of the flash memory. Accessing unnecessary data sectors and data correction sets are wasting time and wasting space of data access buffer. Even the flash memory has functions of partial read and partial write, a pointer, for marking destination of the storing data, will also need to move twice in an event for accessing data sector S12 and its data correction set E12.

Another defect of prior art is, an error coverage rate of a flash memory cannot be increased efficiently because each set of error correction code in the data correction set usually can only detect one bit error in one data sector at a time. Even more complicate data correction algorithms, for error detecting, developed for increasing error coverage rate, the time for processing data is also increasing obviously.

For improving data access performance of the flash memory and increasing the error coverage rate efficiently without much extra processing time, is the purpose of this present invention.

SUMMARY OF THE INVENTION

The present invention provides a data arrangement and a data arranging method in a flash memory for improving access performance and increasing error coverage rate.

One aspect of this present invention is a data arrangement of a flash memory, comprising: a plurality of data sectors stored in a page of a flash memory; and a plurality of data correction sets stored in the page, wherein the data sectors and the data correction sets have a relation of one to one correspondence, each data correction set is generated by a data correction algorithm for detecting error in the corresponding data sector respectively, and each data correction set is next and contiguous to its corresponding data sector.

Another aspect of this present invention is a data arranging method, comprising steps of: storing a first data sector to a page of a flash memory; storing a first data correction set corresponding to the first data sector in the page of the flash memory, wherein the first data correction set is next and contiguous to the first data sector; and repeating the two storing steps for storing a plurality of data sectors and a plurality of corresponding data correction sets until the page is formed.

Another aspect of this present invention is a data arrangement for adjusting an error coverage rate, comprising: a plurality of data sectors stored in a page of the flash memory; and a plurality of data correction sets stored in the page, wherein the data sectors and the data correction sets have a relation of one to one correspondence, and one data correction set is divided into at least two data correction sub-sets for detecting at least one error in its corresponding data sector.

DETAILED DESCRIPTION OF THE PREFERRED EMBODIMENT

Figure 2:
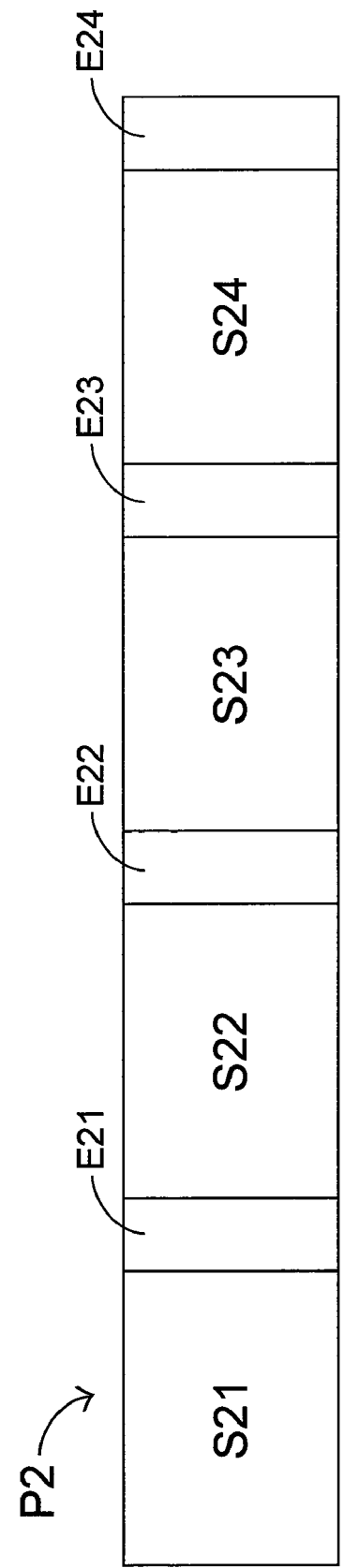
FIG. 2 is a diagram schematically illustrating a first data arrangement of a flash memory for improving data access performance according to the first embodiment of this present invention.

FIG. 2 depicts a first arrangement of the flash memory for improving data access performance of flash memory according to the first embodiment of this present invention. Page P2 comprises four data sectors S21~S24 and four data correction sets E21~E24 corresponding to the four data sectors S21~S24, respectively. By using 2 k-Page as an example, the size of each data sector S21~S24 is 512 bytes and size of each data correction set E21~E24 is 16 bytes.

Figure 1:
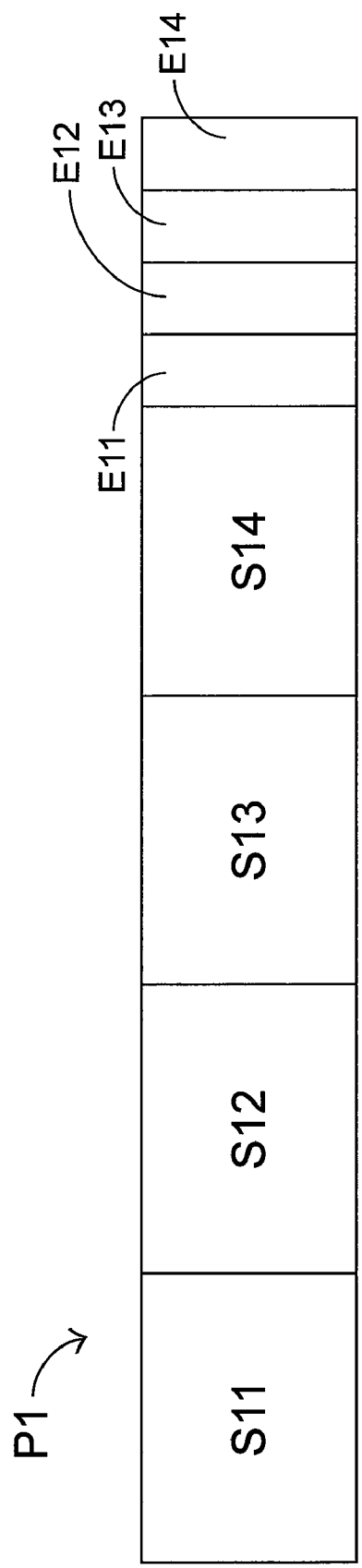
FIG. 1 is a diagram schematically illustrating a conventional data arrangement of a flash memory.

As depicted in FIG. 2, each data correction set is next and contiguous to its corresponding data sector. The new data arrangement is much efficient for a microprocessor to access data. For example, assuming the microprocessor only needs to access data sector S22 in an event, then the microprocessor can immediately access data correction set E22 corresponding to data sector S22 for error detecting after accessing data sector S22. Unnecessary accesses of data sectors S23, S24 and data correction set E21 (FIG. 1) will be skipped. In the first embodiment, data access performance will be enhanced obviously. In addition, without accessing unnecessary data sectors and data correction sets, the new data arrangement also saves the size of the data access buffer. As depicted in FIG. 2, only one data sector S22 and its corresponding data correction set E22 need to be accessed to the data access buffer. That means the data access buffer is smaller and there is no needed to have a larger data access buffer to store unnecessary data sectors and data correction sets.

According to the first data arrangement for improving data access performance of the flash memory, the data arrangement method comprises steps of: storing a first data sector to a flash memory; storing a first data correction set corresponding to the first data sector in the flash memory, wherein the first data correction set is next and contiguous to the first data sector; and repeating the prior two steps to store a plurality of data sectors and a plurality of corresponding data correction sets until a page is formed. In response to the method, the microprocessor can immediately access a data correction set corresponding to a data sector for error detecting without any unnecessary accesses data sectors and data correction sets.

Figure 3:
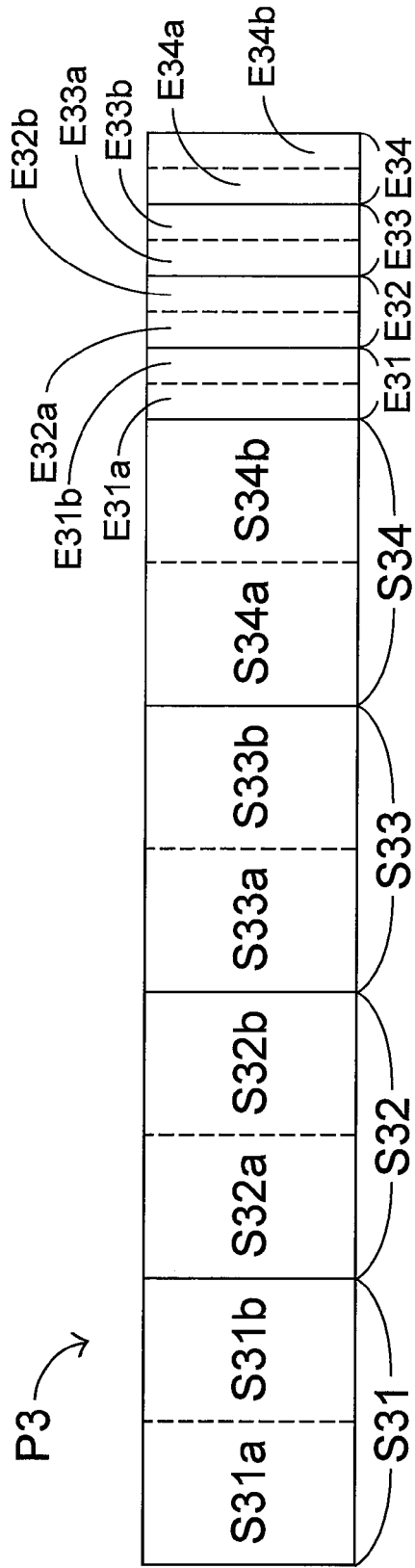
FIG. 3 is a diagram schematically illustrating a second data arrangement of a flash memory for increasing error coverage rate according to the second embodiment of this present invention.

FIG. 3 depicts a second data arrangement of the flash memory for increasing error coverage rate according to a second embodiment of the present invention. Both the four data sectors S31~S34 and the four corresponding data correction sets E31~E34 are divided into eight data sub-sectors S31a~S34b and eight data correction sub-sets E31a~E34b, respectively.

According to the 2K-page and the ECC algorithm, a $(9+3)*2=24$ bits (at least 3 bytes) ECC code is needed in each data correction set for correcting one bit error in its corresponding data sector, which means, only 3 bytes is used in each data correction set (16 bytes) for correcting one bit error in its corresponding data sector (512 bytes).

In FIG. 3, the size of each data sub-sector S31a~S34b is 256 bytes and the size of each data correction sub-set E31a~E34b is 8 bytes. That is to say, a $(8+3)*2=22$ bits (at least 3 bytes) ECC code is needed in each data correction sub-set for correcting one bit error in its corresponding data sub-sector, which means, only 3 bytes is used in each data correction sub-set (8 bytes) for correcting one bit error in its corresponding data sub-sector (256 bytes). Therefore, each data sector S31~S34 will be detected by two data correction sub-sets (E31a, E31b)~(E34a, E34b), respectively. That means one bit error in the data sub-sector S31a and one bit error in the data sub-sector S31b can be detected and corrected by the corresponding data correction sets E31a and E31b. In this way, the error coverage rate in FIG. 3 will be double than the error coverage rate in FIG. 1 by using the second data arrangement of the flash memory.

Figure 4:
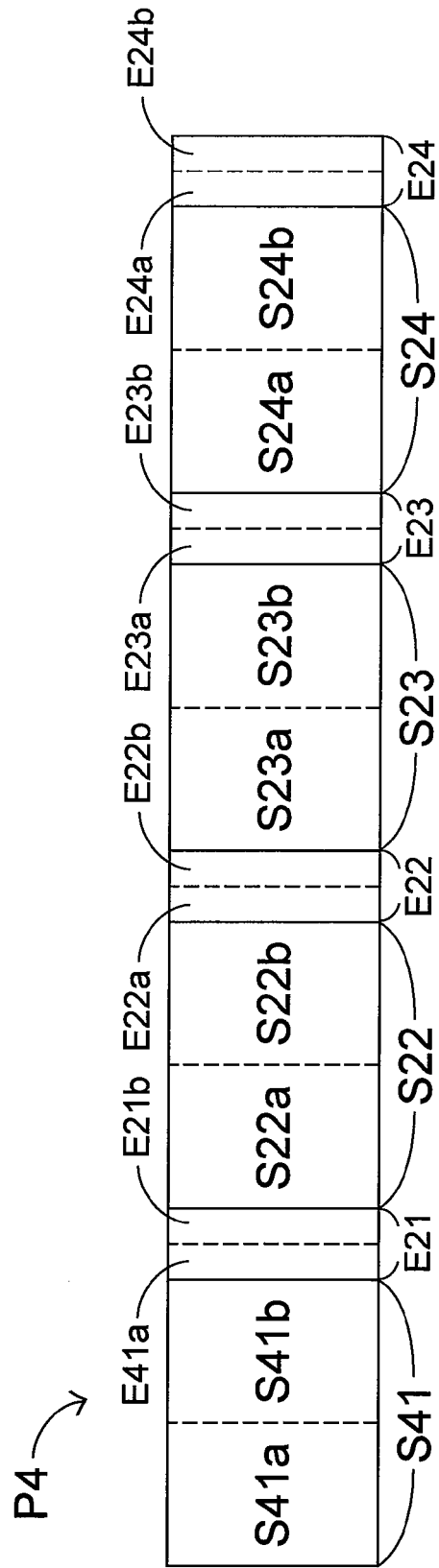
FIG. 4 is a diagram schematically illustrating a third data arrangement for both improving data access performance and increasing error coverage rate according to a third embodiment of this present invention.

It is understood from the above description that the two new data arrangement of the flash memory can be combined together for both improving flash memory access performance and increasing the error coverage rate, as the third embodiment depicted in FIG. 4.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A data arrangement, comprising:
   a plurality of data sectors stored in a page of a flash memory; and
   a plurality of data correction sets stored in the page, wherein the data sectors and the data correction sets have a relation of one to one correspondence, each data correction set is generated by a data correction algorithm for detecting error in the corresponding data sector respectively, and each data correction set is next and contiguous to its corresponding data sector;
   wherein one data correction set is divided into two data correction sub-sets, an error in one portion of the corresponding data sector is detected according to one data correction sub-set, and an error in the other portion of the corresponding data sector is detected according to the other data correction sub-set.

2. The data arrangement according to claim 1, wherein a size of one data sector is 512 bytes and a size of one data correction set is 16 bytes.

3. The data arrangement according to claim 2, wherein the page comprises 4 data sectors and 4 data correction sets.

4. The data arrangement according to claim 1, wherein a size of one data sector is 128 bytes and a size of one data correction set is 4 bytes.

5. The data arrangement according to claim 1, wherein the data correction algorithm is an ECC algorithm.

6. The data arrangement according to claim 1 further comprising a data access buffer having a size being equal to a total sizes of one data sector and one data correction set.

7. A data arranging method, comprising steps of:
   storing a first data sector to a page of a flash memory;
   storing a first data correction set corresponding to the first data sector in the page of the flash memory, wherein the first data correction set is next and contiguous to the first data sector;
   repeating the two storing steps for storing a plurality of data sectors and a plurality of corresponding data correction sets until the page is formed;
   providing a data access buffer having a size being equal to a total sizes of one data sector and one data correction set.

8. The data arranging method according to claim 1, wherein a size of one data sector is 512 bytes and a size of one data correction set is 16 bytes.

9. The data arranging method according to claim 7, wherein a size of one data sector is 128 bytes and a size of one data correction set is 4 bytes.

10. The data arranging method according to claim 7, wherein each data correction set is generated by an ECC algorithm for detecting errors in its corresponding data sector.

11. The data arranging method according to claim 7 further dividing one data correction set into two data correction sub-sets for detecting at least one error in its corresponding data sector, wherein one error in a portion of its corresponding data sector can be detected by one data correction sub-set and one error in the other portion of the corresponding data sector can be detected by the other data correction sub-set.

12. A data arrangement for adjusting an error coverage rate, comprising:
a plurality of data sectors stored in a page of a flash memory; and
a plurality of data correction sets stored in the page, wherein the data sectors and the data correction sets have a relation of one to one correspondence, and one data correction set is divided into at least two data correction sub-sets for detecting at least one error in its corresponding data sector.

13. The data arrangement for adjusting an error coverage rate according to claim 12, wherein a size of one data sector is 512 bytes and a size of one data correction set is 16 bytes.

14. The data arrangement for adjusting an error coverage rate according to claim 13, wherein one data correction set is divided into two data correction sub-set and a size of each data correction sub-set is 8 bytes.

15. The data arrangement for adjusting an error coverage rate according to claim 12, wherein the page comprises 4 data sectors and 4 data correction sets.

16. The data arrangement for adjusting an error coverage rate according to claim 12, wherein each of the data correction sub-sets is generated by an ECC algorithm for detecting one error in a portion of the corresponding data sector.

17. The data arrangement for adjusting an error coverage rate according to claim 12, wherein each data correction set is next and contiguous to its corresponding data sector.

18. The data arrangement for adjusting an error coverage rate according to claim 17 further comprising a data access buffer having a size being equal to a total sizes of one data sector and one data correction set.

19. A data arrangement, comprising:
a plurality of data sectors stored in a page of a flash memory;
a plurality of data correction sets stored in the page, wherein the data sectors and the data correction sets have a relation of one to one correspondence, each data correction set is generated by a data correction algorithm for detecting error in the corresponding data sector respectively, and each data correction set is next and contiguous to its corresponding data sector; and
a data access buffer having a size being equal to a total sizes of one data sector and one data correction set.

20. A data arranging method, comprising steps of:
storing a first data sector to a page of a flash memory;
storing a first data correction set corresponding to the first data sector in the page of the flash memory, wherein the first data correction set is next and contiguous to the first data sector;
repeating the two storing steps for storing a plurality of data sectors and a plurality of corresponding data correction sets until the page is formed; and
dividing one data correction set into two data correction sub-sets for detecting at least one error in its corresponding data sector, wherein an error in one portion of the corresponding data sector is detected according to one data correction sub-set and an error in the other portion of the corresponding data sector is detected according to the other data correction sub-set.

* * * * *